(12) United States Patent
Peterson et al.

(10) Patent No.: US 12,251,724 B2
(45) Date of Patent: Mar. 18, 2025

(54) INDEPENDENT HEATED HOSE

(71) Applicant: Graco Minnesota Inc., Minneapolis, MN (US)

(72) Inventors: Nicholas P. Peterson, Coon Rapids, MN (US); Stephen P. Schneider, Blaine, MN (US); Mark J. Brudevold, Fridley, MN (US); Matthew R. Smith, Minneapolis, MN (US); Joseph E. Tix, Hastings, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 187 days.

(21) Appl. No.: 17/905,217

(22) PCT Filed: Mar. 18, 2021

(86) PCT No.: PCT/US2021/070280
§ 371 (c)(1),
(2) Date: Aug. 29, 2022

(87) PCT Pub. No.: WO2021/189076
PCT Pub. Date: Sep. 23, 2021

(65) Prior Publication Data
US 2023/0130562 A1    Apr. 27, 2023

Related U.S. Application Data

(60) Provisional application No. 62/991,376, filed on Mar. 18, 2020.

(51) Int. Cl.
*B05B 7/16* (2006.01)
*B05B 7/22* (2006.01)
(Continued)

(52) U.S. Cl.
CPC .............. *B05B 7/1693* (2013.01); *B05B 7/22* (2013.01); *B05B 7/26* (2013.01); *F16L 53/38* (2018.01); *H05B 1/0244* (2013.01); *H05B 3/58* (2013.01)

(58) Field of Classification Search
CPC    B05B 7/1693; B05B 7/22; B05B 7/26; B05B 7/0018; B05B 7/0408;
(Continued)

(56) References Cited

U.S. PATENT DOCUMENTS 2,758,194 A * 8/1956 Heron ................. B29D 23/001
                                                        219/544
3,269,422 A * 8/1966 Matthews ................. F16L 9/18
                                                        165/172

(Continued)

FOREIGN PATENT DOCUMENTS

CA    578900 A    7/1959
CA    625469 A    8/1961
(Continued)

OTHER PUBLICATIONS

International Preliminary Report on Patentability for PCT Application No. PCT/US2021/070280, Dated Sep. 29, 2022, pp. 11.

(Continued)

*Primary Examiner* — Bob Zadeh
(74) *Attorney, Agent, or Firm* — Kinney & Lange, P. A.

(57) ABSTRACT

A plural component dispensing system includes a first heated hose, a second heated hose, a controller, and a dispensing device. The first heated hose and the second heated hose include electrical wires that supply heat to the first and second heated hoses to heat fluid components within the first and second heated hoses. The first and second heated hoses are electrically coupled to the controller and are fluidly coupled to the dispensing device. The controller (Continued)

is configured to control and alternate the electrical power supplied to the first heated hose and the second heated hose to heat the first heated hose independent of the second heated hose.

19 Claims, 5 Drawing Sheets

(51) Int. Cl.
*B05B 7/26* (2006.01)
*F16L 53/38* (2018.01)
*H05B 1/02* (2006.01)
*H05B 3/58* (2006.01)

(58) Field of Classification Search
CPC ........ B05B 12/1418; B05B 7/16; F16L 53/38; F16L 11/12; F16L 11/22; H05B 1/0244; H05B 3/58; H05B 1/02; H05B 1/0291; B29B 7/728; B29B 7/7438; B29B 7/7447; B29B 7/748; B29B 7/823; B29B 7/826
See application file for complete search history.

(56) References Cited

U.S. PATENT DOCUMENTS

| | | | |
|---|---|---|---|
| 3,764,779 A | 10/1973 | Kadoya et al. | |
| 4,725,713 A * | 2/1988 | Lehrke | G05D 23/19 374/134 |
| 5,832,178 A | 11/1998 | Schave | |
| 6,005,228 A | 12/1999 | Dickens et al. | |
| 6,513,729 B2 * | 2/2003 | Ochiai | B05B 12/1418 239/700 |
| 7,892,423 B2 | 2/2011 | Rohde et al. | |
| 8,561,921 B1 * | 10/2013 | Showman | B05B 7/2497 239/304 |
| 2004/0099654 A1 | 5/2004 | Pais | |
| 2004/0255560 A1 | 12/2004 | Noble | |
| 2008/0298788 A1 | 12/2008 | Martucci et al. | |
| 2010/0126986 A1 | 5/2010 | Osterholt et al. | |
| 2014/0361099 A1 * | 12/2014 | Marsalek | B05B 7/1693 239/128 |
| 2015/0226362 A1 * | 8/2015 | Brudevold | B32B 27/40 428/656 |
| 2017/0234577 A1 | 8/2017 | Tix et al. | |
| 2018/0111140 A1 * | 4/2018 | Miller | B01F 25/42 |
| 2018/0117609 A1 | 5/2018 | Hodgkinson | |
| 2019/0275543 A1 * | 9/2019 | Bolea | B29B 7/7447 |
| 2019/0344037 A1 * | 11/2019 | Forrester | A61M 16/0833 |
| 2023/0130562 A1 * | 4/2023 | Peterson | B05B 7/1693 222/1 |

FOREIGN PATENT DOCUMENTS

| | | |
|---|---|---|
| CN | 1204266 A | 1/1999 |
| CN | 2390373 Y | 8/2000 |
| CN | 101808689 A | 8/2010 |
| CN | 103438564 A | 12/2013 |
| CN | 204769427 U | 11/2015 |
| CN | 105431235 A | 3/2016 |
| CN | 106764215 A | 5/2017 |
| CN | 107191695 A | 9/2017 |
| CN | 208554850 U | 3/2019 |
| CN | 109595419 A | 4/2019 |
| CN | 209866408 U | 12/2019 |
| JP | H01132089 A | 5/1989 |
| JP | H08281186 A | 10/1996 |
| JP | 2009072690 A * | 4/2009 |
| WO | 2013159030 A1 | 10/2013 |
| WO | 2017075135 A1 | 5/2017 |

OTHER PUBLICATIONS

Akurate Dynamics, LLC, "Deltalite Smart Hose," URL: https://www.akuratedynamics.com/smart-hose, Retrieved Aug. 18, 2022.
Carlisle Fluid Technologies, QuickHeat™ Hose, Form No. 11-157-01, 2020.
International Search Report and Written Opinion for PCT Application No. PCT/US2021/070280, Dated Nov. 29, 2021, pp. 18.
Invitation to Pay Additional Fees for PCT Application No. PCT/US2021/070280, Dated Oct. 8, 2021, pp. 13.
First Chinese Office Action for CN Applicaiton No. 202180021535.5, Dated Mar. 31, 2023, pp. 27.
Second Chinese Office Action for CN Applicaiton No. 202180021535.5, Dated Oct. 11, 2023, pp. 5.

* cited by examiner

INDEPENDENT HEATED HOSE

CROSS-REFERENCE TO RELATED APPLICATION(S)

This application claims the benefit of U.S. Provisional Application Ser. No. 62/991,376, entitled "Independent Heated Hose", filed Mar. 18, 2020, which is herein incorporated by reference. Further, this application claims the benefit of PCT Application No. PCT/US21/70280, entitled "Independent Heated Hose", filed Mar. 18, 2021, which is herein incorporated by reference.

BACKGROUND

The present disclosure relates generally to heated hoses, such as for use with plural component (e.g., fluid) dispensing systems. More particularly, the present disclosure relates to independent electrically heated hoses.

Multiple component (e.g., fluid) applicators include dispensing systems that receive separate inert material components, mix the components according to a predetermined ratio, and then dispense the components as an activated compound. For example, multiple component applicators are often used to dispense epoxies and polyurethanes that solidify after mixing of a resin component and an activating component, which are individually inert. After mixing, a chemical reaction begins that results in the cross-linking, curing, and solidification of the mixture. Therefore, the two components are routed separately in the system so that they can remain segregated for as long as possible. A dispensing device, such as a sprayer or other device, receives each component after it is pumped separately and mixes the components for delivery as an activated compound.

Some dispensing systems include electrically heated hoses that are fabricated by wrapping a conductor around a flexible inner tube and then enshrouding the wrapped tube in a sheathing. The heated hoses increase the temperature of the material components flowing through each hose to a desired temperature, ensuring a proper activated mixture is achieved. Traditional heated hoses simultaneously receive a supply of electrical energy to increase the temperature through resistance heating of the hose. The individual hoses carrying each component are concurrently heated by a single circuit formed by wire extending from the controller and down a first one of the hoses and then returning to the controller along the second one of the hoses. In some examples, the heat of each hose can be independently controlled, and both the A-side and B-side hoses may be simultaneously powered.

SUMMARY

According to one aspect of the disclosure, a plural component dispensing system is configured to mix a first fluid component and a second fluid component into an activated plural component. The plural component dispensing system includes a first fluid source, a second fluid source, a proportioner, an applicator, a first heated hose, a second heated hose, and a controller. The first fluid source contains the first fluid component, and the second fluid source contains the second fluid component. The proportioner is fluidly coupled to the first fluid source and the second fluid source. The applicator includes a mixer, and the applicator is disposed remote from the first fluid source, the second fluid source, and the proportioner. The first heated hose fluidly couples the proportioner to the applicator, and the second heated hose fluidly couples the proportioner to the applicator. The controller is electrically coupled to the first heated hose and the second heated hose and the controller is configured to independently supply an electric current to the first heated hose and independently supply an electric current to the second heated hose.

According to another aspect of the disclosure, a method of operating a plural component dispensing system configured to mix a first fluid component and a second fluid component into an activated plural component material is disclosed. The method includes the steps of: transferring, by a controller, electric current from a power source to a first heating circuit of a first heated hose for a first on time period; transferring, by the controller, electric current from the power source to a second heating circuit of a second heated hose for a second on time period; and alternatingly powering the first heating circuit and the second heating circuit such that the first on time period alternates with the second on time period.

DETAILED DESCRIPTION

Figure 1:
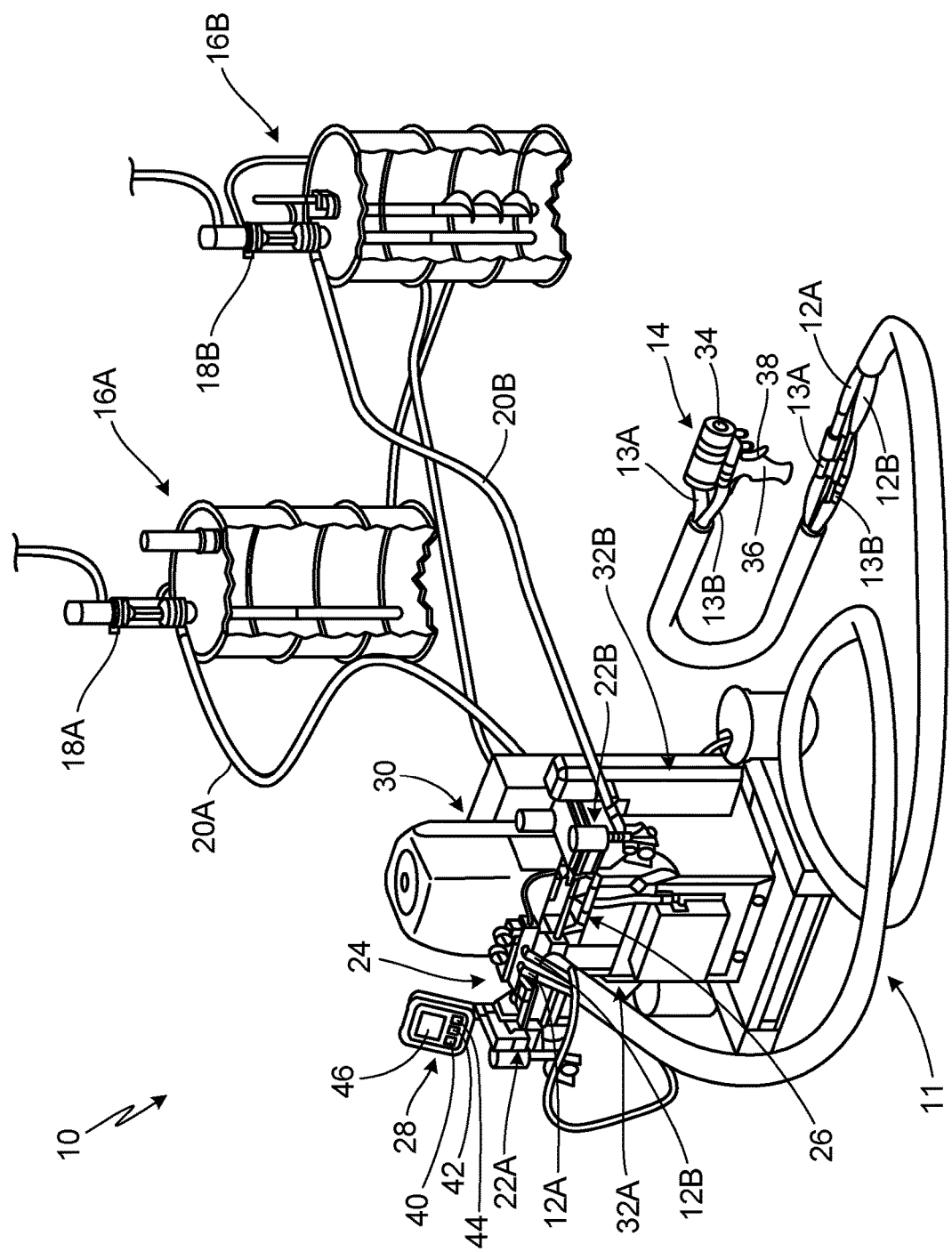
FIG. 1 is an isometric view of a plural component dispensing system including heated hoses.

FIG. 1 is an isometric view of plural component dispensing system 10 including first heated hose 12A and second heated hose 12B. Plural component dispensing system 10 is configured to receive separate inert fluid components, mix the fluid components according to a predetermined ratio, and then dispense the fluid components as an activated plural component mixture. For example, plural component dispensing system 10 can be used to dispense epoxies and polyurethanes that solidify after mixing of a resin component and an activating component, which are individually inert before mixing. Plural component dispensing system 10 will hereinafter be referred to as system 10. System 10 includes hose assembly 11 including first heated hose 12A, second heated hose 12B, first whip hose 13A, and second whip hose 13B. System 10 further includes applicator 14, first fluid source 16A, second fluid source 16B, feed pumps 18A and 18B, feed lines 20A and 20B, proportioner pumps 22A and 22B, proportioner 24, motor 26, controller 28, and power source 30.

System 10 is configured to pump a first fluid component and a second fluid component to applicator 14 to form an activated plural component that is sprayed from applicator 14. The fluid components are pumped according to target parameters, such as ratio, temperature, and/or pressure. The first and second fluid components are mixed at applicator 14 to form the activated plural component spray material that is sprayed onto a substrate by applicator 14. For example, one of the first and second fluid components can be a catalyst, such as isocyanate, and the other one of the first and second fluid components can a resin, such as polyol resin, that combine to form the activated plural component spray material, such as a spray foam.

First fluid source 16A is configured to store and contain the first fluid component until system 10 is activated and the first fluid component begins flowing through system 10. Likewise, second fluid source 16B is configured to store and contain the second fluid component until system 10 is activated and the second fluid component begins flowing through system 10. As such, first fluid source 16A and second fluid source 16B hold the individual fluid components during both the storage and spraying process. In some examples, first fluid source 16A and second fluid source 16B are portable and can be moved between job sites. In some examples, first fluid source 16A and second fluid source 16B can be drums, such as 55-gallon drums, among other options.

Feed pumps 18A, 18B are mounted to first fluid source 16A and second fluid source 16B, respectively. Feed lines 20A, 20B respectively extend from feed pumps 18A, 18B to proportioner pumps 22A, 22B. Feed pumps 18A, 18B draw the first and second fluid components from first fluid source 16A and second fluid source 16B, respectively, and pump the fluid components through feed lines 20A, 20B to proportioner pumps 22A, 22B. Feed pumps 18A, 18B provide the fluid components to proportioner pumps 22A, 22B under pressure. In some examples, feed pumps 18A, 18B are configured to pump the fluid components to proportioner pumps 22A, 22B at pressures of at least about 0.35 Megapascal (MPa) (about 50 pounds per square inch (psi)). In some examples, feed pumps 18A, 18B are configured to pump the fluid components at pressures of up to about 1.75 MPa (about 250 psi). Feed pumps 18A, 18B provide the fluid components to proportioner pumps 22A, 22B under pressure to fill proportioner pumps 22A, 22B during pumping, preventing proportioner pumps 22A, 22B from starving. Feeding proportioner pumps 22A, 22B under pressure prevents the fluid components from being pumped downstream at a ratio other than the target ratio due to insufficient fill of proportioner pumps 22A, 22B. Feed pumps 18A, 18B can be of any desired configuration suitable for pumping the fluid components to proportioner pumps 22A, 22B under pressure, such as pneumatic, hydraulic, or electric pumps.

Proportioner pumps 22A, 22B receive the first and second fluid components from feed pumps 18A, 18B and pump the individual fluid components downstream through first heated hose 12A and second heated hose 12B, respectively, to applicator 14. Proportioner pumps 22A, 22B increase the pressure of the first and second fluid components from the feed pressure to a spray pressure. The spray pressure is greater than the feed pressure generated by feed pumps 18A, 18B. In some examples, proportioner pumps 22A, 22B can pump the fluid components at pressures between about 3.4 MPa (about 500 psi) and about 35.5 MPa (about 5000 psi). In some examples, proportioner pumps 22A, 22B can pump the fluid components at pressures between about 10.3 MPa (about 1500 psi) and about 25.6 MPa (about 4000 psi). In some examples, proportioner pumps 22A, 22B are configured to pump at pressures between about 11.7 MPa (1700 psi) and about 24.1 megapascal (MPa) (about 3500 pounds per square inch (psi)). It is understood that the spray pressure can be at any desired level for facilitating desirable properties in the sprayed material. It is further understood that, in other examples, proportioner pumps 22A, 22B can be gravity fed pumps, but a system having pressure fed proportion pumps 22A, 22B is discussed in more detail.

Proportioner 24 can support various components of system 10. In some examples, motor 26, controller 28, power source 30, and proportioner pumps 22A, 22B are supported by proportioner 24. In other examples, proportioner 24 can support more or fewer components than components 26, 28, 30, 22A, and 22B. Motor 26 is connected to both proportioner pumps 22A, 22B. Motor 26 and proportioner pumps 22A, 22B can be considered as forming a pumping assembly of proportioner 24. Motor 26 can be an electric motor, a hydraulic drive motor, a pneumatic drive motor, or any other type of motor capable of inducing fluid flow through system 10. In some examples, motor 26 is connected to proportioner pumps 22A, 22B such that motor 26 can simultaneously cause displacement of the fluid displacement members of each of proportioner pumps 22A, 22B. In other examples, proportioner pumps 22A, 22B can each be independently connected to separate motors 26, such that an independent motor 26 causes displacement of the fluid displacement members of each of proportioner pumps 22A, 22B.

In some examples, proportioner 24 can include primary heaters 32A, 32B. In other examples, proportioner 24 may not include primary heaters 32A, 32B. Primary heaters 32A, 32B are configured to increase temperatures of the first and second fluid components, respectively, to an operating temperature above the ambient temperature during operation of system 10. Primary heaters 32A, 32B can be disposed within proportioner 24. Primary heaters 32A, 32B can be disposed downstream from proportioner pumps 22A, 22B such that the output from each proportioner pumps 22A, 22B flows through primary heaters 32A, 32B.

First heated hose 12A and second heated hose 12B respectively extend from proportioner 24 to applicator 14. First heated hose 12A and second heated hose 12B form a heated hose assembly for transferring the individual component materials downstream from proportioner 24. First heated hose 12A is fluidly connected to proportioner pump 22A to receive the first fluid component from proportioner pump 22A. Second heated hose 12B is fluidly connected to proportioner pump 22 to receive the second fluid component from proportioner pump 22B. First heated hose 12A and second heated hose 12B each include heating elements configured to further increase and/or maintain the elevated temperature of the first and second fluid components, discussed further below. In some examples, primary heaters 32A, 32B, first heated hose 12A, and second heated hose 12B can be configured to raise and/or maintain the temperature to at least about 37.8 degrees C. (about 100 degrees F.). In some examples, primary heaters 32A, 32B, first heated hose 12A, and second heated hose 12B can be configured to operate at temperatures up to about 82 degrees C. (about 180 degrees F.). Maintaining the first and second fluid components at elevated temperatures facilitates proper mixing and the formation of desired material characteristics in the activated plural component spray material.

Applicator 14 is disposed at an opposite end of hose assembly 11 from proportioner 24. In some examples, applicator 14 can include mixer 34, handle 36, and trigger 38. In other examples, applicator 14 can include more or fewer components than components 34, 36, and 38. Applicator 14 receives the first and second fluid components from first heated hose 12A and second heated hose 12B, respectively. The first and second fluid components are mixed in mixer 34, which is connected to and, in some examples, disposed within applicator 14. The fluid components mix within mixer 34 to form the activated plural component spray material. Mixer 34 is the first location within system 10 where the first and second fluid components interact and mix. The first and second fluid components are isolated from each other at all locations upstream of mixer 34. The spray material is ejected through a spray orifice of applicator 14 and applied to the substrate. In the example shown in FIG. 1, a user can grasp handle 36 and actuate trigger 38 to cause spraying by applicator 14 onto the desired substrate. It is understood that, in other examples, applicator 14 can be mounted to a moving (e.g. robotic) member and applicator 14 can be activated by controller 28 or another automated system to dispense the spray material onto the desired substrate.

In some examples, a whip hose assembly is disposed between the heated hose assembly and applicator 14. The whip hose assembly can provide additional flexibility during spraying. In the example shown, first whip hose 13A can be positioned between first heated hose 12A and applicator 14, fluidly coupling first heated hose 12A to applicator 14. Likewise, second whip hose 13B can be positioned between second heated hose 12B and applicator 14, fluidly coupling second heated hose 12B to applicator 14. In other examples, first whip hose 13A and second whip hose 13B may not be included in system 10, such that first heated hose 12A and second heated hose 12B are directly connected to applicator 14. Further, it is to be understood that while the heating of first heated hose 12A and second heated hose 12B are discussed in detail, the teachings are equally applicable to heating of first whip hose 13A and second whip hose 13B, and to other types of heated hoses.

In the example shown, controller 28 includes control circuitry 40, memory 42, and communication device 44. However, in certain examples, controller 28 can include more or fewer components than components 40, 42, and 44. Control circuitry 40 is configured to implement functionality and/or process instructions for execution within controller 28. For instance, control circuitry 40 can be capable of processing instructions stored in memory 42. Examples of control circuitry 40 can include any one or more of a microprocessor, a digital signal processor (DSP), an application specific integrated circuit (ASIC), a field-programmable gate array (FPGA), or other equivalent discrete or integrated logic circuitry.

Memory 42 can be configured to store information within controller 28 during operation of system 10. Memory 42, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 42 is a temporary memory, meaning that a primary purpose of memory 42 is not long-term storage. Memory 42, in some examples, is described as volatile memory, meaning that memory 42 does not maintain stored contents when power to controller 28 is turned off. Examples of volatile memories can include random access memories (RAM), dynamic random-access memories (DRAM), static random-access memories (SRAM), and other forms of volatile memories. In some examples, memory 42 is used to store program instructions for execution by processor(s) 40. Memory 42, in one example, is used by software or applications running on controller 28 (e.g., a software program implementing a system architecture) to temporarily store information during program execution. Memory 42, in some examples, also includes one or more computer-readable storage media. Memory 42 can be configured to store larger amounts of information than volatile memory. Memory 42 can further be configured for long-term storage of information. In some examples, memory 42 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 28, in some examples, also includes communication device 44. Controller 28, in one example, utilizes communication device 44 to communicate with external devices via one or more networks, such as one or more wireless or wired networks or both. Communication device 44 can be a network interface card, such as an Ethernet card, an optical transceiver, a radio frequency transceiver, or any other type of device that can send and receive information. Other examples of such network interfaces can include Bluetooth®, 3G, 4G, 5G, and Wi-Fi radio computing devices as well as Universal Serial Bus (USB).

Controller 28 is operatively connected to first heated hose 12A, second heated hose 12B, feed pumps 18A and 18B, proportioner pumps 22A and 22B, proportioner 24, motor 26, and power source 30. Controller 28 is operatively connected to motor 26, either electrically or communicatively, to control pumping by proportioner pumps 22A and 22B. In some examples, controller 28 is operatively connected to feed pumps 18A and 18B, either electrically or communicatively, to control pumping by feed pumps 18A and 18B. Controller 28 can be connected to motor 26 and feed pumps 18A and 18B via either wired or wireless connections to provide commands to and cause operation of feed pumps 18A and 18B and motor 26. Controller 28 can control operation of one or both of motor 26 and feed pumps 18A and 18B based on data received indicating operational characteristics of the first and second fluid components flowing through first heated hose 12A and second heated hose 12B to applicator 14. Controller 28 is operatively connected to first heated hose 12A and second heated hose 12B, either electrically or communicatively, to control the temperature of first heated hose 12A and second heated hose 12B, discussed further below. Further, controller 28 is operatively connected to power source 30, either electrically or communicatively, to control the electrical power provided to first heated hose 12A and second heated hose 12B, discussed further below.

Controller 28 can be operatively connected to user interface 46, either electrically or communicatively, to receive user input from user interface 46 and provide outputs via user interface 46. User interface 46 can be any graphical and/or mechanical interface that enables user interaction with controller 28. For example, user interface 46 can implement a graphical user interface displayed at a display device of user interface 46 for presenting information to and/or receiving input from a user. User interface 46 can include graphical navigation and control elements, such as graphical buttons or other graphical control elements presented at the display device. User interface 46, in some examples, includes physical navigation and control elements, such as physically actuated buttons or other physical navigation and control elements. In other examples, user interface 46 can be a remote device that is communicatively coupled to controller 28, allowing a user to input commands to controller 28 from a location distant from controller 28. In general, user interface 46 can include any input and/or output devices and control elements that can enable user interaction with controller 28.

During operation, the first and second fluid components are pumped to applicator 14 from first fluid source 16A and second fluid source 16B by feed pumps 18A and 18B and proportioner pumps 22A and 22B, respectively, and are mixed at applicator 14 to form the activated plural component spray material. Flows of the first fluid component and the second fluid component to applicator 14 are controlled based on one or more target operating parameters, such as fluid ratio, pressure, and temperature. Controller 28 controls operation of proportioner 24 based on at least one of the target operating parameters to control the flow of the component materials downstream to the applicator 14. Controlling the flow based on the target operating parameters generates a spray material having desired material properties, such as porosity, expansion rate, expansion volume, thermal resistivity, etc. Spraying according to the target operating parameters further provides an even spray pattern, fine droplet size, adequate flow, and good mixing. Spraying according to the target operating parameters further prevents excessive overspray, undesirably high flow rates, difficult control, and excessive wear.

In the example shown, controller 28 controls electric signals which can be referred to as current, voltage, or power, to heated hoses 12A, 12B to control the temperatures of the component material flows through heated hoses 12A, 12B. It is understood that a reference to the term "current" can be replaced with a different measure of power such as voltage or the term "power" itself.

To apply the spray material, the user manipulates applicator 14 by grasping handle 36 and depressing trigger 38 to cause flow through applicator 14 and mixing within mixer 34. The upstream pressures generated by proportioner pumps 22A and 22B drive the fluid components through mixer 34, causing mixing of the fluid components within mixer 34 to form the activated plural component spray material. The pressures upstream of applicator 14 drive the activated plural component out through the orifice of applicator 14 to cause spraying by applicator 14. As such, proportioner pumps 22A and 22B drive the fluid components through mixer 34 and generate the spray ejected from applicator 14.

Feed pump 18A draws the first fluid component from first fluid source 16A and pumps the first fluid component through feed line 20A to proportioner pump 22A. Feed pump 18B draws the second fluid component from second fluid source 16B and pumps the second fluid component through feed line 20B to proportioner pump 22B. Proportioner pumps 22A, 22B receive the component material flows from feed lines 20A, 20B and pump the component materials downstream through heated hoses 12A, 12B. Proportioner pump 22A increases a pressure of the first material and pumps the first material through heated hose 12A and to applicator 14. Proportioner pump 22B increases a pressure of the second material and pumps the second material through heated hose 12B and to applicator.

Sensors within system 10 generate parameter data regarding the individual fluid components in each of first heated hose 12A and second heated hose 12B, such as temperature, flow rate, pressure, etc. Controller 28 can adjust the outputs from proportioner 24 based on the parameter data received from the sensors to maintain the downstream operating parameter at the target spray level for that parameter. Controller 28 can further control electric current flow to heated hoses 12A, 12B to control heating of the component materials within the heated hoses 12A, 12B.

Primary heaters 32A and 32B increase the temperatures of the materials emitted by proportioner pumps 22A and 22B, respectively. The fluid components are pumped downstream through first heated hose 12A and second heated hose 12B between proportioner pumps 22A and 22B and applicator 14. First heated hose 12A and second heated hose 12B are configured to increase or maintain the temperature of the fluids flowing through each hose at desired temperatures, which are temperatures above ambient, discussed in more detail below. Heating the fluid components reduces the viscosity of the fluid components and enhances mixing to cause the formation of desired characteristics in the activated plural component spray material. The first and second fluid components combine within mixer 34 of applicator 14 to form the activated plural component spray material that is sprayed from applicator 14 onto the substrate.

Controller 28 is individually connected to first heated hose 12A and second heated hose 12B to individually power heated hoses 12A, 12B. A first heating circuit is formed by resistance wire contained inside, outside, or in combination along the length of first heated hose 12A. A second heating circuit is formed by resistance wire contained inside, outside, or in combination along the length of second heated hose 12B. Two wires extend a length of first heated hose 12A and two wires extend a length of second heated hose 12B. Power is applied to the two wires of each heated hose 12A, 12B. The two wires of each heated hose 12A, 12B are connected at the end of first heated hose 12A and second heated hose 12B or within first whip hose 13A and second whip hose 13B, respectively.

The two wires of first heated hose 12A are connected together to form the first heating circuit. The two wires of second heated hose 12B are connected together to form the second heating circuit. The wires of first heated hose 12A are dedicated to first heated hose 12A and do not cross over to second heated hose 12B. The wires of first heated hose 12A are not wrapped around and do not extend through second heated hose 12B. The wires of first heated hose 12A are not disposed within a sheath of second heated hose 12B. The wires of second heated hose 12B are dedicated to second heated hose 12B and do not cross over to first heated hose 12A. The wires of second heated hose 12B are not wrapped around and do not extend through first heated hose 12A. The wires of second heated hose 12B are not disposed within a sheath of first heated hose 12A.

In the external hose examples, two separate resistance wires are wrapped along the length of each heated hose 12A, 12B. In an internal hose example, one resistance wire passes internally through each hose 12A, 12B and one return wire runs externally alongside each hose 12A, 12B. In a hybrid example, one resistance wire passes internally through each hose 12A, 12B and one resistance wire is wrapped externally along each hose 12A, 12B.

Controller 28 controls power to the first heating circuit of first heated hose 12A and to the second heating circuit of second heated hose 12B. The controller 28 can, in some examples, alternate power between first heated hose 12A and second heated hose 12B instead of providing power to both heated hoses 12A, 12B at the same time, though it is understood that controller 28 can simultaneously power heated hoses 12A, 12B. A benefit of such configuration is that it allows for resistance measurement of the heating element of each heated hose 12A, 12B so independent temperatures can be determined without a separate temperature sensor. Further, alternating the supply of electric current to first heated hose 12A and second heated hose 12B allows the resistance measurements to be made using a single measurement circuit within controller 28 for both hoses 12A, 12B, rather than requiring a separate measurement circuit for each hose 12A, 12B which is required when both of the hoses are simultaneously powered. The single measurement circuit reduces costs and errors. Controller 28 can also independently power each heated hose 12A, 12B in instances where the material in one of heated hoses 12A, 12B requires additional heating to achieve desired properties. For example, one material may require additional heating to reduce viscosity and achieve optimal mixing. Controller 28 can independently control the power supplied to each heated hose 12A, 12B to independently heat the component materials within each heated hose 12A, 12B.

Controller 28 can control power to each heated hose 12A, 12B according to a frequency. For example, current can be applied to the first heating circuit of first heated hose 12A according to an A-side frequency and current can be applied to the second heating circuit of second heated hose 12B according to a B-side frequency. For example, the controller 28 may apply a fixed current to only first heated hose 12A for 0.5 seconds, and then apply a fixed current to only second heated hose 12B for 0.5 seconds, which is then repeated. It is understood, however, that the switching frequency can be set at any desired level suitable for heating the component materials.

Figure 2A:
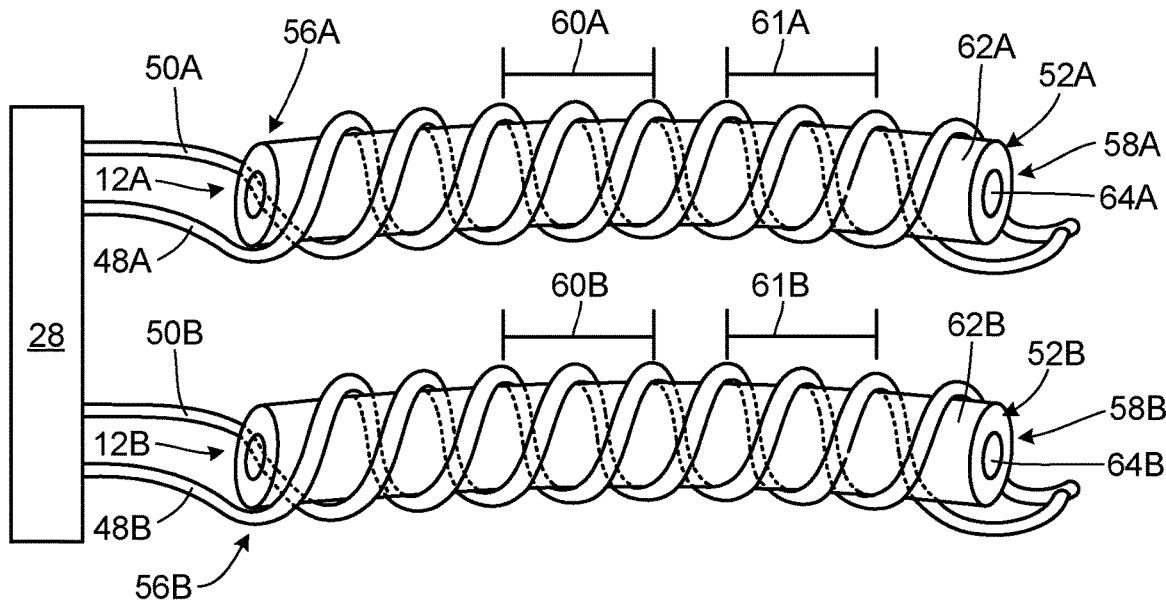
FIG. 2A is an isometric view of an embodiment of the heated hose in FIG. 1.
Figure 2B:
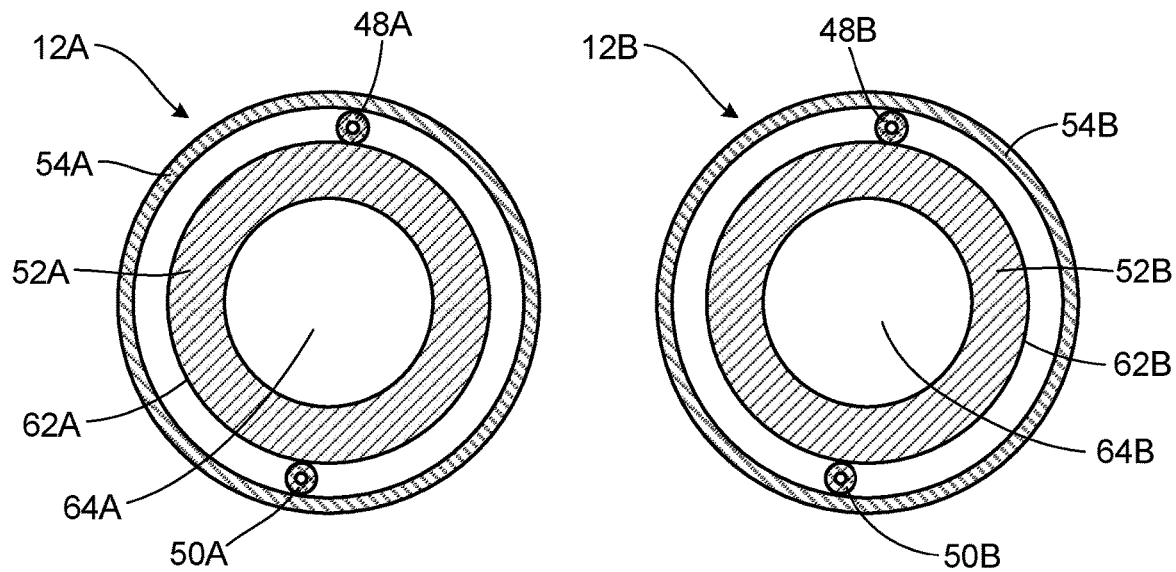
FIG. 2B is a cross-sectional view of the heated hoses of FIG. 2A.

FIG. 2A is a perspective view of a first embodiment of first heated hose 12A and second heated hose 12B. FIG. 2B is a cross-sectional view of the first embodiment of first heated hose 12A and second heated hose 12B. FIGS. 2A and 2B will be discussed together. First heated hose 12A includes first wire 48A, second wire 50A, first inner tube 52A, first sheath 54A, first end 56A, second end 58A, and pitch gaps 60A. First inner tube 52A includes external surface 62A and interior 64A. Second heated hose 12B includes third wire 48B, fourth wire 50B, second inner tube 52B, second sheath 54B, first end 56B, second end 58B, and pitch gaps 60B. Second inner tube 52B includes external surface 62B and interior 64B.

Heated hoses 12A, 12B are shown as having external heating configurations. First wire 48A and second wire 50A are electrical wires that can extend a full length of first heated hose 12A. More specifically, first wire 48A and second wire 50A are electrical wires that extend a full length of first inner tube 52A. First inner tube 52A is an impermeable tube, hose, conduit, or the like with a hollow interior 64A allowing a fluid to flow through interior 64A of first inner tube 52A. First inner tube 52A can be a flexible tube, allowing a user to manipulate and bend first inner tube 52A during use. First inner tube 52A can be any desired length and first inner tube 52A can extend from proportioner pump 22A to applicator 14, fluidly coupling proportioner pump 22A to applicator 14. In some examples, the heated hose 12A can be formed by multiple hose sections connected together. It is understood that the individual hose sections can be of any desired length. In one example, each hose section can be up to 50 feet (about 15.25 meters) in length. In another example, each hose section can be up to 100 feet (about 30.5 meters) in length. The hose sections can be fluidly and electrically connected together to form the heated hose 12A. In some examples, first whip hose 13A can be positioned between first inner tube 52A and applicator 14, fluidly coupling first inner tube 52A to applicator 14. In other examples, first whip hose 13A may not be included in system 10.

First wire 48A is wrapped around external surface 62A of first inner tube 52A in a helical configuration from first end 56A to second end 58A of first heated hose 12A. Second wire 50A is wrapped around external surface 62A of first inner tube 52A in a helical configuration from second end 58A to first end 56A of first heated hose 12A. Further, first wire 48A and second wire 50A are disposed radially between external surface 62A of first inner tube 52A and first sheath 54A. First sheath 54A encompasses and secures the positions of first wire 48A and second wire 50A relative to external surface 62A of first inner tube 52A. Further, first sheath 54A is a protective layer that protects first wire 48A, second wire 50A, and first inner tube 52A from damage and the outside environment.

Second wire 50A is wrapped around external surface 62A of first inner tube 52A in a helical configuration such that second wire 50A is positioned in a plurality of pitch gaps 60A of the helical configuration of first wire 48A. Pitch gaps 60A are defined as the gap or distance between adjacent coils of the helical configuration of first wire 48A. Second wire 50A is positioned in the plurality of pitch gaps 60A extending the length of first inner tube 52A such that second wire 50A remains free from contact with first wire 48A until first wire 48A and second wire 50A are joined at second end 58A of first heated hose 12A. First wire 48A is similarly disposed in the pitch gaps 61A of the second wire 50A. As such, first wire 48A and second wire 50A are alternatingly disposed along the length of inner tube 52A. An axial line extending along the external surface 62A and disposed parallel to a longitudinal axis extending through inner tube 52A from the first end 56A to the second end 58A alternatingly passes through first wire 48A and second wire 50A.

First wire 48A and second wire 50A are electrically coupled at second end 58A of first heated hose 12A, allowing an electric current to flow from first wire 48A to second wire 50A. The ends of first wire 48A and second wire 50A that are not electrically coupled, extend from first end 56A of first heated hose 12A and are electrically coupled to controller 28. First wire 48A and second wire 50A are electrical wires that are configured to transmit an electric current. Transmitting an electric current through first wire 48A and second wire 50A inherently causes an increase in temperature of first wire 48A and second wire 50A. Further, the shape, material, size, and axial spacing (e.g., the size of pitch gaps 60A, 61A) of first wire 48A and second wire 50A can each be altered to achieve the desired power density along first hose 12A to facilitate desired heating by first wire 48A and second wire 50A. The power density affects the electricity required and the duration for which power should be applied to achieve the desired temperature. First wire 48A and second wire 50A are heated to a desired temperature to generate heat that is transferred through the adjacent first inner tube 52A and to the fluid flowing through first heated hose 12A.

As such, first wire 48A is configured to receive an electric current at first end 56A of first heated hose 12A and transfer the electric current through the helical configuration of first wire 48A to second end 58A of first heated hose 12A. The electric current transfers from first wire 48A to second wire 50A, and the electric current transfers through the helical configuration of second wire 50A to first end 56A of first heated hose 12A. The electric current transferring through first wire 48A and second wire 50A increases the temperature of both first wire 48A and second wire 50A. The increased temperature/generated heat is transferred to first inner tube 52A, which transfers the heat to the fluid flowing through interior 64A of first inner tube 52A to increase the temperature of the fluid. Therefore, first wire 48A and second wire 50A are configured to receive and transfer an electric current to increase the temperature of the fluid flowing through first inner tube 52A, discussed further below.

Third wire 48B and fourth wire 50B are electrical wires that can extend a full length of second heated hose 12B.

More specifically, third wire 48B and fourth wire 50B are electrical wires that extend a full length of second inner tube 52B. Second inner tube 52B is an impermeable tube, hose, conduit, or the like with a hollow interior 64B allowing a fluid to flow through interior 64B of second inner tube 52B. Second inner tube 52B can be a flexible tube, allowing a user to manipulate and bend second inner tube 52B during use. Second inner tube 52B can be any desired length and second inner tube 52B can extend from proportioner pump 22B to applicator 14, fluidly coupling proportioner pump 22B to applicator 14. In some examples, the heated hose 12B can be formed by multiple hose sections connected together. For example, each hose section can be up to 50 feet (about 15.25 meters) in length. The hose sections can be fluidly and electrically connected together to form the heated hose 12B.

Third wire 48B is wrapped around external surface 62B of second inner tube 52B in a helical configuration from first end 56B to second end 58B of second heated hose 12B. Fourth wire 50B is wrapped around external surface 62B of second inner tube 52B in a helical configuration from second end 58B to first end 56B of second heated hose 12B. Further, third wire 48B and fourth wire 50B are disposed radially between external surface 62B of second inner tube 52B and second sheath 54B. Second sheath 54B encompasses and secures the positions of third wire 48B and fourth wire 50B relative to external surface 62B of second inner tube 52B. Further, second sheath 54B is a protective layer that protects third wire 48B, fourth wire 50B, and second inner tube 52B from damage and the outside environment.

Fourth wire 50B is wrapped around external surface 62B of second inner tube 52B in a helical configuration such that fourth wire 50B is positioned in a plurality of pitch gaps 60B of the helical configuration of third wire 48B. Pitch gaps 60B are defined as the gap or distance between adjacent coils of the helical configuration of third wire 48B. Fourth wire 50B is positioned in the plurality of pitch gaps 60B extending the length of second inner tube 52B such that fourth wire 50B remains free from contact with third wire 48B until third wire 48B and fourth wire 50B are joined at second end 58B of second heated hose 12B. Third wire 48B is similarly disposed in the pitch gaps 61B of the fourth wire 50B. As such, third wire 48B and fourth wire 50B are alternatingly disposed along the length of inner tube 52B. An axial line extending along the external surface 62B and disposed parallel to a longitudinal axis extending through inner tube 52B from first end 56B to second end 58B alternatingly passes through third wire 48B and fourth wire 50B.

Third wire 48B and fourth wire 50B are electrically coupled at second end 58B of second heated hose 12B, allowing an electric current to flow from third wire 48B to fourth wire 50B. The ends of third wire 48B and fourth wire 50B that are not electrically coupled, extend from first end 56B of second heated hose 12B and are electrically coupled to controller 28. Third wire 48B and fourth wire 50B are electrical wires that are configured to transmit an electric current. Transmitting an electric current through third wire 48B and fourth wire 50B inherently causes an increase in temperature of third wire 48B and fourth wire 50B. Further, the shape, material, size, and axial spacing (e.g. the size of pitch gaps 60B, 61B) of third wire 48B and fourth wire 50B can each be altered to achieve the desired power density. Third wire 48B and fourth wire 50B are heated to a desired temperature to generate heat that is transferred through the adjacent second inner tube 52B and to the fluid flowing through second heated hose 12B.

As such, third wire 48B is configured to receive an electric current at first end 56B of second heated hose 12B and transfer the electric current through the helical configuration of third wire 48B to second end 58B of second heated hose 12B. The electric current transfers from third wire 48B to fourth wire 50B, and the electric current transfers through the helical configuration of fourth wire 50B to first end 56B of second heated hose 12B. The electric current transferring through third wire 48B and fourth wire 50B increases the temperature of both third wire 48B and fourth wire 50B. The increased temperature/generated heat is transferred to second inner tube 52B, which transfers the heat to the fluid flowing through interior 64B of second inner tube 52B to increase the temperature of the fluid. Therefore, third wire 48B and fourth wire 50B are configured to receive and transfer an electric current to increase the temperature of the fluid flowing through second inner tube 52B, discussed further below.

Figure 3A:
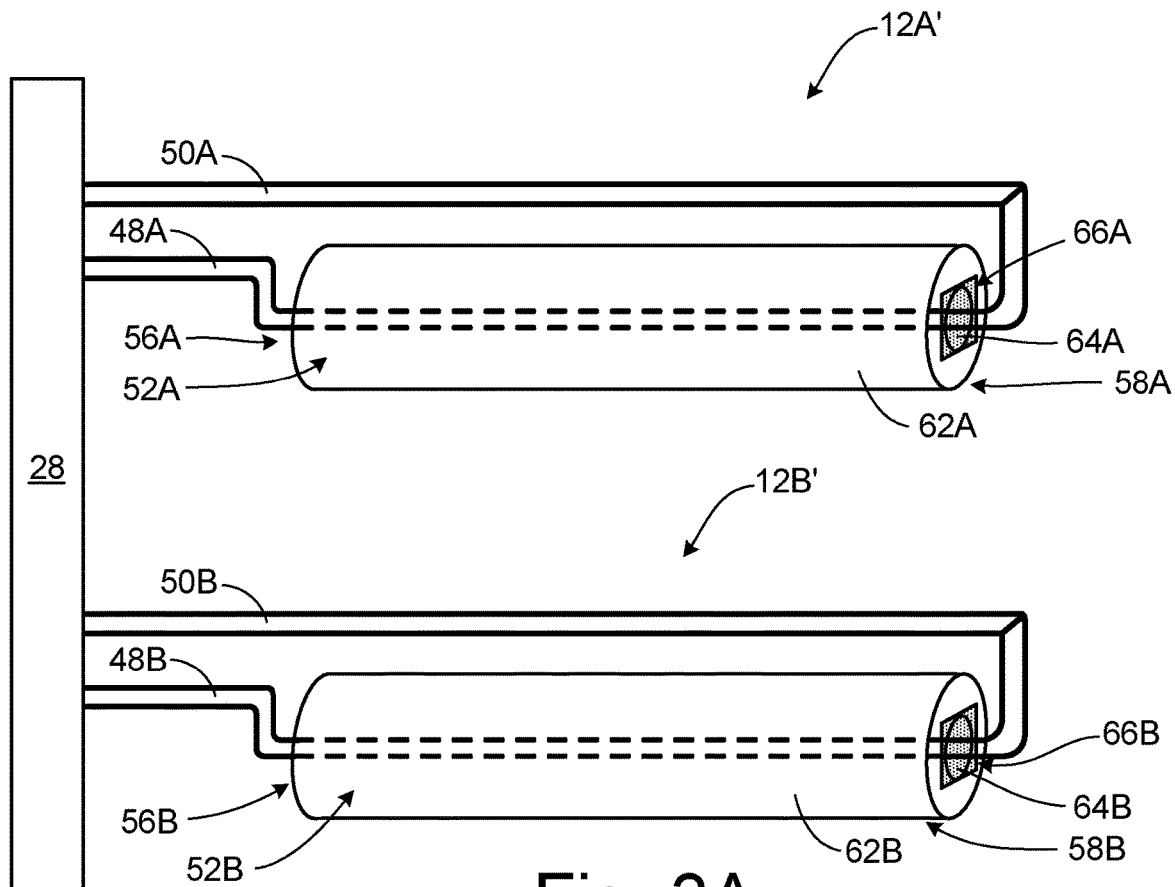
FIG. 3A is an isometric view of another embodiment of the heated hose in FIG. 1.
Figure 3B:
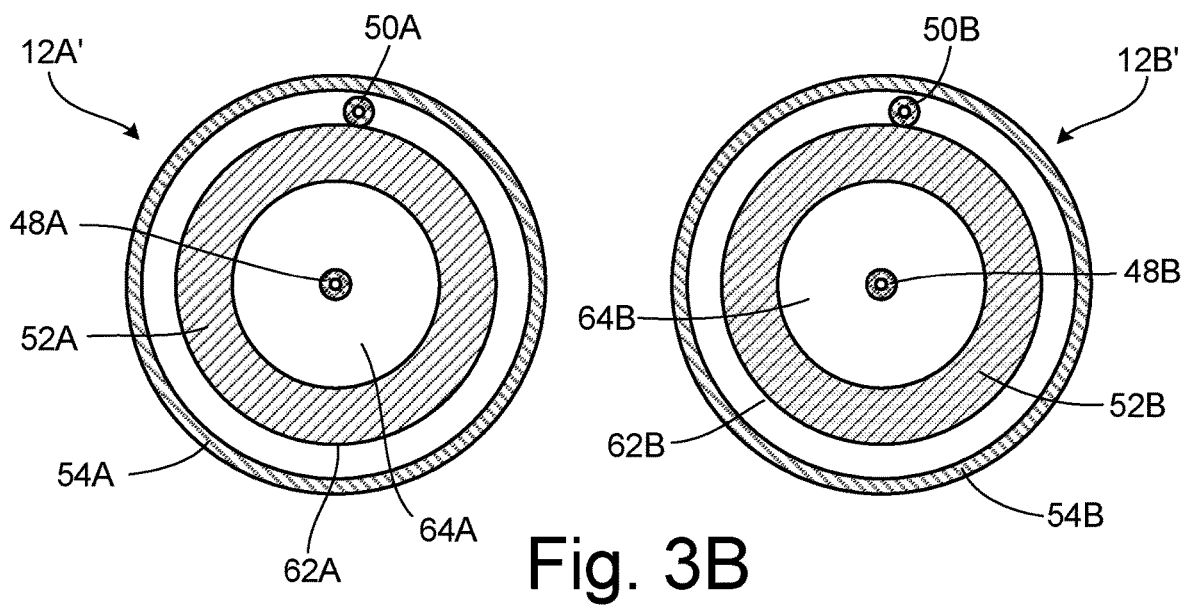
FIG. 3B is a cross-sectional view of the heated hoses of FIG. 3A.

FIG. 3A is an isometric view of a second embodiment of first heated hose 12A' and second heated hose 12B'. FIG. 3B is a cross-sectional view of the second embodiment of first heated hose 12A' and second heated hose 12B'. FIGS. 3A and 3B will be discussed together. First heated hose 12A' includes first wire 48A, second wire 50A, first inner tube 52A, first sheath 54A, first end 56A, and second end 58A. First inner tube 52A includes external surface 62A, interior 64A, and couplings 66A. Second heated hose 12B' includes third wire 48B, fourth wire 50B, second inner tube 52B, second sheath 54B, first end 56B, and second end 58B. Second inner tube 52B includes external surface 62B, interior 64B, and couplings 66B.

Heated hoses 12A', 12B' are shown as having internal heating configurations. First wire 48A and second wire 50A are electrical wires that can extend a full length of first heated hose 12A'. More specifically, first wire 48A and second wire 50A are electrical wires that extend a full length of first inner tube 52A. First inner tube 52A is an impermeable tube, hose, conduit, or the like with a hollow interior 64A allowing a fluid to flow through interior 64A of first inner tube 52A. First inner tube 52A can be a flexible tube, allowing a user to manipulate and bend first inner tube 52A during use. First inner tube 52A can be any desired length and first inner tube 52A can extend from proportioner pump 22A to applicator 14, fluidly coupling proportioner pump 22A to applicator 14. In some examples, the heated hose 12A' can be formed by multiple hose sections connected together. For example, each hose section can be up to 50 feet (about 15.25 meters) in length. The hose sections can be fluidly and electrically connected together to form the heated hose 12A'.

First wire 48A is positioned within and extends through interior 64A of first inner tube 52A from first end 56A to second end 58A of first heated hose 12A'. Second wire 50A extends along external surface 62A of first inner tube 52A from second end 58A to first end 56A of first heated hose 12A'. First wire 48A is coupled to first inner tube 52A through couplings 66A positioned at first end 56A and second end 58A of first heated hose 12A'. Couplings 66A provides an electrical connection point for first wire 48A and second wire 50A. Coupling 66A facilitates the electrical connection between the internal first wire 48A and the external second wire 50A. Second wire 50A is disposed radially between external surface 62A of first inner tube 52A and first sheath 54A. First sheath 54A encompasses and secures the position of second wire 50A relative to external surface 62A of first inner tube 52A. Further, first sheath 54A is a protective layer that protects second wire 50A and first inner tube 52A from damage and the outside environment.

First wire 48A and second wire 50A extend the length of first inner tube 52A in an axial manner. Further, first wire 48A and second wire 50A remain free from contact between each other along the length of first inner tube 52A until first wire 48A and second wire 50A are joined at second end 58A of first heated hose 12A'. First wire 48A is disposed within the interior 64A of the inner tube 52A such that first wire 48A directly contacts the material flowing through heated hose 12A'. First wire 48A can have a length greater than inner tube 52A such that first wire 48A has slack within inner tube 52A.

First wire 48A and second wire 50A are electrically coupled at second end 58A of first heated hose 12A', allowing an electric current to flow from first wire 48A to second wire 50A. The ends of first wire 48A and second wire 50A that are not electrically coupled together, extend from first end 56A of first heated hose 12A' and are electrically coupled to controller 28. First wire 48A and second wire 50A are electrical wires that are configured to transmit an electric current. Transmitting an electric current through first wire 48A and second wire 50A inherently results in an increased temperature of first wire 48A and second wire 50A. Further, the shape, material, and size of first wire 48A and second wire 50A can each be altered to achieve the desired power density facilitated by first wire 48A and second wire 50A. For example, first wire 48A can include a shape, material, and size resulting in first wire 48A increasing to a desired temperature. The heat generated from first wire 48A can then be transferred to the fluid flowing past first wire 48A and directly interfacing with first wire 48A within interior 64A of first inner tube 52A, increasing the temperature of the flowing fluid. In contrast, second wire 50A can include a shape, material, and size that has less resistance, resulting in less power density due to second wire 50A not being in contact with the fluid. In the example shown, second wire 50A can be referred to as a return wire that completes the heating circuit but is not intended to result in direct heating benefit. The lower resistivity of second wire 50A as compared to first wire 48A provides minimal temperature increase (i.e. to a temperature lower than first wire 48A), allowing the electric current to transfer through second wire 50A more easily and efficiently than through first wire 48A. The lower resistivity of second wire 50A allows second wire 50A to dissipate substantially less heat energy into the surrounding environment, as compared to first wire 48A.

As such, first wire 48A is configured to receive an electric current at first end 56A of first heated hose 12A' and transfer the electric current through first wire 48A (which is positioned within interior 64A of first inner tube 52A) to second end 58A of first heated hose 12A'. The electric current transfers from first wire 48A to second wire 50A, and the electric current transfers through second wire 50A to first end 56A of first heated hose 12A'. The electric current transferring through first wire 48A increases the temperature of first wire 48A. The generated heat transfers to the fluid flowing through interior 64A of first inner tube 52A to increase the temperature of the fluid. The electric current transferring through second wire 50A encounters minimal resistance, allowing the electric current to transfer through second wire 50A easily and efficiently, minimally increasing the temperature of second wire 50A. Therefore, first wire 48A is configured as a heating wire that increases the temperature of the fluid flowing through first inner tube 52A. Second wire 50A is configured as a return wire to return the electric current while minimally increasing in temperature, discussed further below.

Second heated hose 12B' includes third wire 48B, fourth wire 50B, second inner tube 52B, second sheath 54B, first end 56B, and second end 58B. Second inner tube 52B includes external surface 62B, interior 64B, and couplings 66B. Second heated hose 12B' can be structurally and operationally identical to first heated hose 12A', such that the discussion of heated hose 12A' is understood to apply to heated hose 12B', except where noted. In other words, the discussion of first wire 48A equally applies to third wire 48B; the discussion of second wire 50A equally applies to fourth wire 50B; the discussion of first inner tube 52A equally applies to second inner tube 52B; etc. Therefore, to avoid redundancy, a discussion of each component of second heated hose 12B' will not be presented below.

Figure 4A:
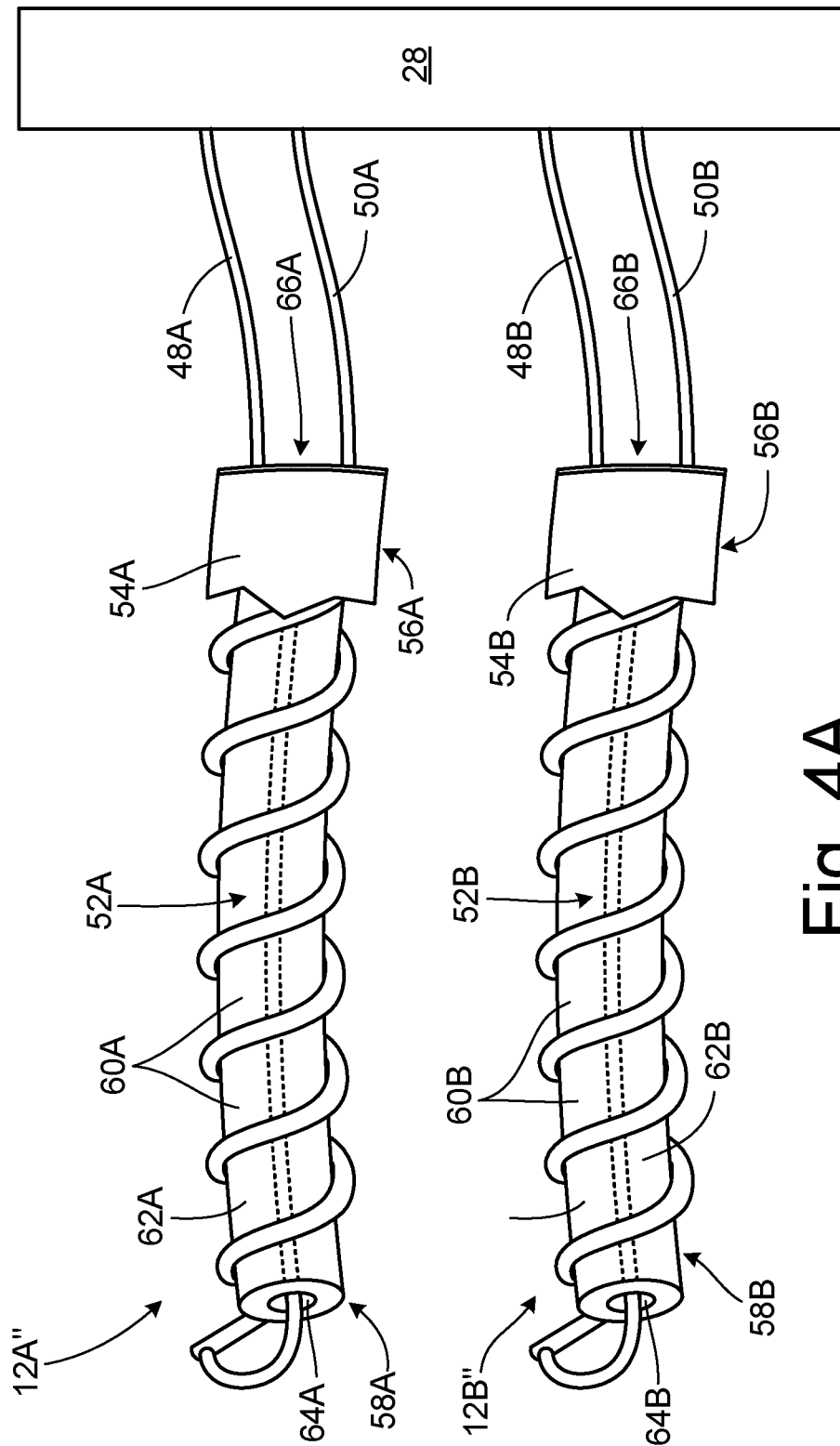
FIG. 4A is an isometric view of another embodiment of the heated hose in FIG. 1.
Figure 4B:
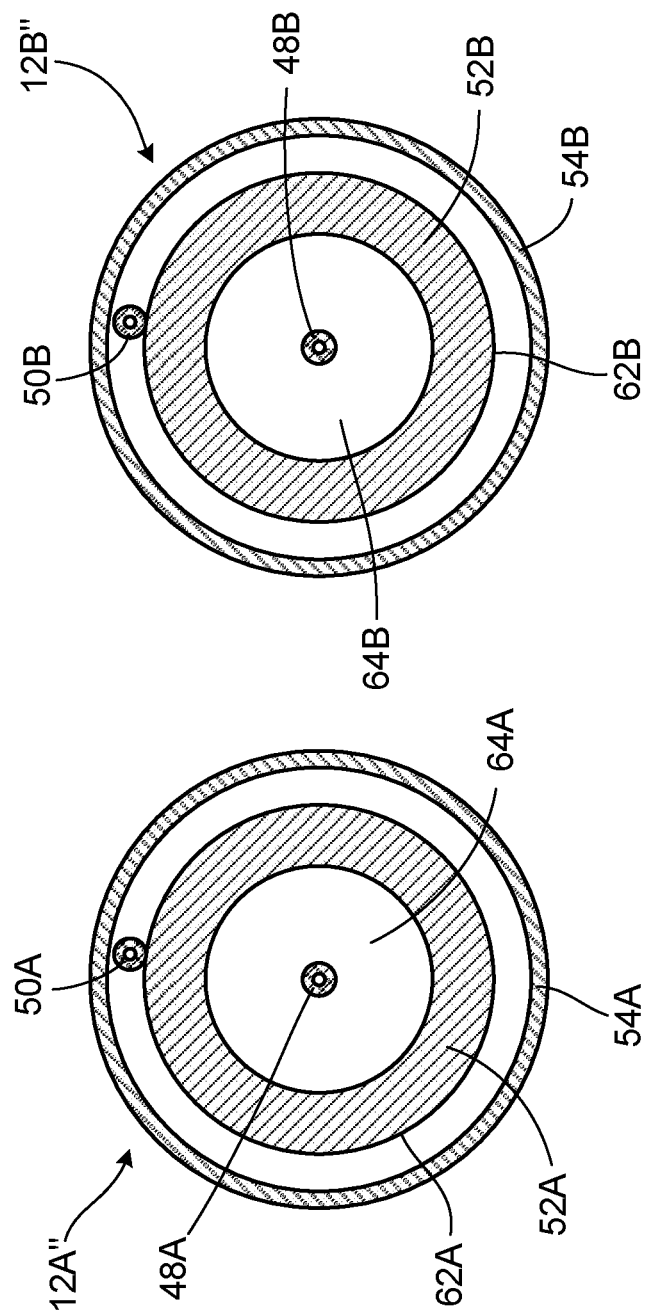
FIG. 4B is a cross-sectional view of the heated hoses of FIG. 4A.

FIG. 4A is a perspective view of a third embodiment of first heated hose 12A" and second heated hose 12B". FIG. 4B is a cross-sectional view of the third embodiment of first heated hose 12A" and second heated hose 12B". FIGS. 4A and 4B will be discussed together. First heated hose 12A" includes first wire 48A, second wire 50A, first inner tube 52A, first sheath 54A, first end 56A, and second end 58A. First inner tube 52A includes external surface 62A and interior 64A. Second heated hose 12B" includes third wire 48B, fourth wire 50B, second inner tube 52B, second sheath 54B, first end 56B, and second end 58B. Second inner tube 52B includes external surface 62B and interior 64B.

Heated hoses 12A", 12B" have hybrid heating configurations with heating wires extending through the interior of the heated hose 12A", 12B" and wrapped around and along the heated hose 12A", 12B". First wire 48A and second wire 50A are electrical wires that can extend a full length of first heated hose 12A". More specifically, first wire 48A and second wire 50A are electrical wires that extend a full length of first inner tube 52A. First inner tube 52A is an impermeable tube, hose, conduit, or the like with a hollow interior 64A allowing a fluid to flow through interior 64A of first inner tube 52A. First inner tube 52A can be a flexible tube, allowing a user to manipulate and bend first inner tube 52A during use. First inner tube 52A can be any desired length and first inner tube 52A can extend from proportioner pump 22A to applicator 14, fluidly coupling proportioner pump 22A to applicator 14. In some examples, the heated hose 12A" can be formed by multiple hose sections connected together and each section can be of any desired length. In one example, each hose section can be up to 50 feet (about 15.25 meters) in length. In another example, each hose section can be up to 100 feet (about 30.5 meters) in length. The hose sections can be fluidly and electrically connected together to form the heated hose 12A".

First wire 48A is positioned within and extends through interior 64A of first inner tube 52A from first end 56A to second end 58A of first heated hose 12A". Second wire 50A is wrapped around external surface 62A of first inner tube 52A in a helical configuration from second end 58A to first end 56A of first heated hose 12A". First wire 48A is coupled to first inner tube 52A through couplings 66A positioned at first end 56A and second end 58A of first heated hose 12A". Second wire 50A is disposed radially between external surface 62A of first inner tube 52A and first sheath 54A. First sheath 54A encompasses and secures the position of second wire 50A relative to external surface 62A of first inner tube 52A. Further, first sheath 54A is a protective layer that protects second wire 50A and first inner tube 52A from damage and the outside environment. First wire 48A extends the length of first inner tube 52A in a generally straight configuration and second wire 50A extends the length of first inner tube 52A in a generally helical configuration. First wire 48A and second wire 50A remain free from contact along the length of first inner tube 52A until first wire 48A and second wire 50A are joined at second end 58A of first heated hose 12A".

First wire 48A and second wire 50A are electrically coupled at second end 58A of first heated hose 12A", allowing an electric current to flow from first wire 48A to second wire 50A. First wire 48A and second wire 50A form a heating circuit for heated hose 12A". The ends of first wire 48A and second wire 50A that are not electrically coupled, extend from first end 56A of first heated hose 12A" and are electrically coupled to controller 28. First wire 48A and second wire 50A are electrical wires that are configured to transmit an electric current. Transmitting an electric current through first wire 48A and second wire 50A inherently results in an increased temperature of first wire 48A and second wire 50A. Further, the shape, material, size, and pitch gaps 60A of first wire 48A and second wire 50A can each be altered to achieve the desired power density provided by wires 48A, 50A for hose 12A". First wire 48A and second wire 50A are heated to a desired temperature to generate heat that is transferred to the fluid flowing through interior 64A of first heated hose 12A".

As such, first wire 48A is configured to receive an electric current at first end 56A of first heated hose 12A" and transfer the electric current through first wire 48A (which is positioned within interior 64A of first inner tube 52A) to second end 58A of first heated hose 12A". The electric current transfers from first wire 48A to second wire 50A, and the electric current transfers through the helical configuration of second wire 50A to first end 56A of first heated hose 12A".

The electric current transferring through first wire 48A and second wire 50A increases the temperature of both first wire 48A and second wire 50A. The increased temperature/ generated heat by first wire 48A is transferred directly to the fluid flowing past first wire 48A and through interior 64A of first inner tube 52A to increase the temperature of the fluid. Further, the increased temperature/generated heat by second wire 50A is transferred to first inner tube 52A, which transfers the heat to the fluid flowing through interior 64A of first inner tube 52A to further increase the temperature of the fluid. First wire 48A directly interfaces with the fluid to directly heat the fluid, similar to the example shown in FIGS. 3A-3B. Second wire 50A is wrapped helically around the tube 52A and extends along the length of the tube 52A, similar to the example shown in FIGS. 2A-2B. Therefore, first wire 48A and second wire 50A are configured to receive and transfer an electric current to increase the temperature of the fluid flowing through first inner tube 52A, discussed further below. Both first wire 48A and second wire 50A provide beneficial heating to the fluid flow through heated hose 12A". While first wire 48A is described as the outbound wire and second wire 50A is described as the return wire to controller 28, it is understood that, in some examples, the outbound wire can be wrapped helically around inner tube 52A and the return wire can extend through the interior 64A.

Second heated hose 12B" includes third wire 48B, fourth wire 50B, second inner tube 52B, second sheath 54B, first end 56B, and second end 58B. Second inner tube 52B includes external surface 62B and interior 64B. Second heated hose 12B" is substantially similar to first heated hose 12A", such that a discussion of heated hose 12A" is understood to apply to heated hose 12B", except where noted. In other words, the discussion of first wire 48A equally applies to third wire 48B; the discussion of second wire 50A equally applies to fourth wire 50B; the discussion of first inner tube 52A equally applies to second inner tube 52B; etc. Therefore, to avoid redundancy, a discussion of each component of second heated hose 12B" will not be presented below.

Although the heated hose assemblies shown in FIGS. 2A-4B are shown as having similarly configured heated hoses (e.g., the heated hose assembly of FIGS. 2A-2B has first and second heated hoses with external heating configurations; the heated hose assembly of FIGS. 3A-3B has first and second heated hoses with internal heating configurations; and the heated hose assembly of FIGS. 4A-4B has first and second heated hoses with hybrid heating configurations), it is understood that a heated hose assembly can have heated hoses having the same or differing configurations. In one example, a first heated hose can have an external heating configuration with two wires extending along a length of external surface 62A in a helical configuration and the second heated hose can have an internal heating configuration with a wire extending through interior 64B and a return wire extending along external surface 62B. In another example, the first heated hose can have an external heating configuration with two wires extending along a length of external surface 62A in a helical configuration and the second heated hose can have a hybrid configuration with a wire extending through interior 64B and a return wire extending along a length of external surface 62B in a helical configuration. In another example, the first heated hose can have a hybrid heating configuration with a wire extending through interior 64A and a return wire extending along a length of external surface 62A in a helical configuration and the second heated hose can have an internal heating configuration with a wire extending through interior 64B and a return wire extending along external surface 62B. Moreover, while various ones of wires 48A, 50A, 48B, 50B are described as the heating and return wires, it is understood that various examples can provide current through the heating circuit in either or both directions. For example, the hybrid heating configuration can have the outbound signal through the helical wire 50A and the return signal through the internal wire 48A. In the internal example, the outbound signal can travel through wire 50A and return through wire 48A.

In each of the first embodiment (FIGS. 2A-2B), the second embodiment (FIGS. 3A-3B), and the third embodiment (FIGS. 4A-4B), controller 28 is electrically coupled to the two heated hoses forming the heated hose assembly (e.g., to both first heated hose 12A and second heated hose 12B; to both first heated hose 12A' and second heated hose 12B'; or to both first heated hose 12A" and second heated hose 12B"). Further, the operation and functionality of controller 28 in each of the first embodiment (FIGS. 2A-2B), the second embodiment (FIGS. 3A-3B), and the third embodiment (FIGS. 4A-4B) is substantially the same for each embodiment. Therefore, a discussion of the operation of controller 28 will be presented for only the first embodiment shown in FIGS. 2A-2B. But it is to be understood that the discussion of the operation and functionality of controller 28 equally applies regardless of the particular configuration of the heating circuits of the first and second heated hoses 12A and 12B, respectively.

Referring to FIGS. 1 and 2A-2B, controller 28 is electrically coupled to first heated hose 12A and second heated hose 12B. More specifically, controller 28 is electrically coupled to first wire 48A, second wire 50A, third wire 48B, and fourth wire 50B via a wired connection to form first and second electric heating circuits. The first heating circuit is formed for heated hose 12A by first wire 48A and second wire 50A. The second heating circuit is formed for heated hose 12B by third wire 48B and fourth wire 50B. Controller 28 is configured to independently supply an electric current to first heated hose 12A and second heated hose 12B. As such, controller 28 is configured to regulate an amount of electrical energy provided to first heated hose 12A and second heated hose 12B by controlling the amount of electrical energy/electric current transferring from power source 30 to first heated hose 12A and second heated hose 12B. Power source 30 can be any source of electrical energy/electric current, such as an electric generator or an electrical wall power socket, among other options.

In operation, controller 28 is configured to independently control power to first heated hose 12A and second heated hose 12B. In some examples, controller 28 is configured to alternate providing the electric current to first heated hose 12A and second heated hose 12B. In some examples, controller 28 is configured to control power to first heated hose 12A and second heated hose 12B such that only one of first heated hose 12A or second heated hose 12B receives the electric current at any given time. More specifically, controller 28 provides the electric current from power source 30 to first wire 48A of first heated hose 12A for a first time period, while concurrently refraining from providing the electric current from power source 30 to second heated hose 12B for the first time period. Likewise, controller 28 transfers the electric current from power source 30 to third wire 48B of second heated hose 12B for a second time period, while concurrently refraining from transferring the electric current from power source 30 to first heated hose 12A for the second time period. In some examples, the first time period and the second time period are different periods of time, but the first time period and the second time period are the same length of time. In other examples, the first time period and the second time period are different periods of time, and the first time period and the second time period are different lengths of time.

For example, controller 28 can control power to each heated hose 12A, 12B according to a frequency. The frequency can be pre-set and stored in the memory of controller 28. In some examples, controller 28 can be configured to alter the length of the on and off times for power to one or both of the heated hoses 12A, 12B depending on the operating conditions. For example, controller 28 can increase the amount of time that current is provided to one or both of heated hoses 12A, 12B based on a low ambient temperature at the job site. Current can be applied to the heating circuit of heated hose 12A according to an A-side frequency and current can be applied to the heating circuit of heated hose 12B according to a B-side frequency. For example, the controller 28 may apply a fixed current to only the A hose 12A for 0.5 seconds, and then apply a fixed current to only the B hose 12B for 0.5 seconds, which is then repeated. As such, the on period of heated hose 12A can be the off period for heated hose 12B, while the on period for heated hose 12B can be the off period for heated hose 12A.

In operation, controller 28 provides the electric current through first wire 48A extending from first end 56A of first heated hose 12A to second end 58A of first heated hose 12A. The electric current transferring through first wire 48A produces heat and the heat is transferred to the fluid flowing through first heated hose 12A. The electric current transfers from first wire 48A and into second wire 50A at second end 58A. The electric current then transfers through second wire 50A extending from second end 58A of first heated hose 12A to first end 56A of first heated hose 12A and returns to controller 28 and/or power source 30. As discussed above, both of the first wire 48A and second wire 50B can provide heating to the fluid flowing through first heated hose 12A, depending on the wire configuration. In an example, the transferring of the electric current through first wire 48A and returning the electric current through second wire 50A back to controller 28 and/or power source 30 can happen during a first time period. In some examples, the first time period can be 0.5 seconds. In other examples, the first time period can be more or less than 0.5 seconds. In some examples, the first time period can be 1 second, 2 seconds, 5 second, 30 seconds, 1 minute, or 5 minutes, among other options. During the first time period, controller 28 refrains from providing an electric current to third wire 48B of second heated hose 12B.

Once the first time period is complete, controller 28 provides electric current through third wire 48B extending from first end 56B of second heated hose 12B to second end 58B of second heated hose 12B. The electric current transferring through third wire 48B produces heat and the heat is transferred to the fluid flowing through second heated hose 12B. The electric current transfers from third wire 48B and into fourth wire 50B at second end 58B. The electric current then transfers through fourth wire 50B extending from second end 58B of second heated hose 12B to first end 56B of second heated hose 12B and returns to controller 28 and/or power source 30. In an example, the electric current flow through third wire 48B and returning the electric current through fourth wire 50B back to controller 28 and/or power source 30 can happen during a second time period. In some examples, the second time period can be 0.5 seconds. In other examples, the second time period can be more or less than 0.5 seconds. In some examples, the second time period can be 1 second, 2 seconds, 5 second, 30 seconds, 1 minute, or 5 minutes, among other options. During the second time period, controller 28 refrains from providing an electric current to first wire 48A of first heated hose 12A.

Controller 28 alternating the electric current supplied to first heated hose 12A and second heated hose 12B provides many benefits that will be appreciated by those skilled in the art. Alternating the electric current supplied to first heated hose 12A and second heated hose 12B allows for resistance measurements of each of first heated hose 12A and second heated hose 12B heating elements such that independent temperatures for each can be determined without a separate temperature sensor. Alternating the supply of electric current to first heated hose 12A and second heated hose 12B allows the resistance measurements to be made using a single measurement circuit within controller 28 for both hoses 12A, 12B, rather than requiring a separate measurement circuit for each hose 12A, 12B. Controller 28 can receive electrical signals from each heated hose separately and process the signal to determine the temperature based on the resistive properties of the wires. Further, receiving the signals from each hose at alternating times allows controller 28 to process one signal before receiving the next signal. As such, eliminating the need for separate temperature sensors and separate measurement circuits also provides the benefit of lowering the cost of system 10 based on fewer required components. Alternatingly powering first heated hose 12A and second heated hose 12B can also provide costs savings as compared to simultaneous heat systems.

First heated hose 12A and second heated hose 12B of system 10 also can have twice the resistance per foot as compared to traditional simultaneously operated heated hoses. The resistance for the resistance wires is configured to produce desired wattage when control alternates between heated hose 12A and heated hose 12B. For example, resistance per foot may be twice what it would be if power supply was simultaneous rather than alternating, which is a result, without being bound by theory, of average wattage equaling current squared multiplied by resistance multiplied by 50%. As discussed, the pitch gaps 60A, 60B, wire gauge, and wire material can each be altered to achieve the desired resistance heating per foot of first heated hose 12A and second heated hose 12B. The wires of heated hoses 12A, 12B have a smaller wire gauge to increase the resistance of the wire and produce more heat for first heated hose 12A and second heated hose 12B. Using the smaller gauge wire creates more resistance and heat and also uses less material, which results in a lower cost for first wire 48A, second wire 50A, third wire 48B, and fourth wire 50B.

In addition, the pitch gaps 60A, 60B, wire gauge, and wire material can each be altered to reduce the heat loss along the length of first heated hose 12A and second heated hose 12B. For example, in some embodiments, a lower resistance wire can be used for the externally coupled second wire 50A and fourth wire 50B to facilitate more efficient electric current transfer back to controller 28 and/or power source 30 while minimizing the heat lost to the environment. The differences in resistance between the first and second wires of the heating circuits for each hose 12A, 12B is facilitated by the independent heating circuit requiring only half of the circuit to provide the desired heat, though both portions of the circuit can be utilized as discussed above.

Referring to each of FIGS. 1-4B, watt density is defined as the power per linear foot (watt per foot) of the heated hoses 12A, 12B at the maximum allowable electrical current at the reference resistance (resistance at 20 degrees Celsius). Therefore, heated hoses with different flow path geometries have different designed power densities in order to maintain system performance. In some examples, a heated hose 12A, 12B can have a designed watt density of at least 9 watts per hose foot (about 0.295 joules/second per centimeter). In one example, a heated hose 12A, 12B having an inner diameter (e.g., the diameter of the interior 64A, 64B) of about 0.25 inches (about 0.635 cm) can have a designed watt density between about 10 watts per hose foot (about 0.328 joules/second per centimeter) and about 12 watts per hose foot (about 0.394 joules/second per centimeter), inclusive. In another examples, a heated hose 12A, 12B having an inner diameter of about 0.375 inches (about 0.9525 cm) can have a designed watt density between about 9 watts per hose foot (about 0.295 joules/second per centimeter) and about 14 watts per hose foot (about 0.459 joules/second per centimeter), inclusive. In another example, a heated hose 12A, 12B having an inner diameter of about 0.5 inches (about 1.27 cm) can have a designed watt density between about 12 watts per hose foot (about 0.394 joules/second per centimeter) and about 15 watts per hose foot (about 0.492 joules/second per centimeter), inclusive. In contrast, traditional heated hoses receiving a simultaneous and, in some cases, continuous supply of electrical current have watt densities in the range of about 5.5 watts per hose foot (about 0.180 joules/second per centimeter) to about 7.5 watts per hose foot (about 0.246 joules/second per centimeter) for a single hose within a heated hose assembly (depending on many factors such as hose diameter, insulation, material, and thickness, among other variables). As such, the watt density of heated hoses 12A, 12B can be twice the watt density as compared to a traditional heated hose, allowing power to alternatingly be supplied to heated hoses 12A, 12B while maintaining the required heat and/or power density for each individual heated hose 12A, 12B.

In addition, watt density has an inverse relationship with resistivity, such that a given electrical input to an electrically heated hose produces a specific power density. For example, an electrical current input of 35 amps into a heated hose 12A, 12B with an overall resistivity of 0.0098 ohms per hose foot will produce a power density of 12 watts per hose foot (about 0.394 joules/second per centimeter). In another example, an electrical current input of 45 amps into a heated hose 12A, 12B with an overall resistivity of 0.00593 ohms per hose foot will produce a power density of 12 watts per hose foot (about 0.394 joules/second per centimeter). It is to be noted that "per hose foot" is not necessarily the same as "per wire foot", particularly for wires wrapped helically around a hose that will have a significantly greater overall length than the overall hose length. As such, the resistance of each individual wire can vary to achieve the desired power per linear foot of heated hoses 12A, 12B. In one example, wires 48A, 48B, 50A, 50B of the external heating configuration shown in FIGS. 2A-2B can each have a resistance between about 0.0015 and about 0.0018 ohms per wire foot, inclusive. In another example, heating wires 48A, 48B of the internal heating configuration shown in FIGS. 3A-3B can each have a resistance between about 0.004 and about 0.006 ohms per wire foot, inclusive; and return wires 50A, 50B of the internal heating configuration shown in FIGS. 3A-3B can each have a resistance between about 0.0004 and about 0.0012 ohms per wire foot, inclusive. The individual resistance of wires 48A, 48B, 50A, 50B can be altered to obtain the desired overall resistance per hose foot of heated hoses 12A, 12B to achieve the desired power density of heated hoses 12A, 12B. A combination of resistivities can be utilized in the hybrid configuration shown in FIGS. 4A-4B, such as a resistance between about 0.0015 and about 0.0018 ohms per wire foot, inclusive, for heating wires 48A, 48B and a resistance between about 0.0004 and about 0.0012 ohms per wire foot, inclusive, for return wires 50A, 50B. Each individual wire of a heated hose 12A, 12B can employ different resistivities to achieve an overall desired resistance per hose foot for heated hoses 12A, 12B.

Targeted power densities are specifically chosen to maintain heating performance of heated hoses 12A, 12B under the alternating independent temperature control method, described above. A heated hose with a power density that is too low will not be able to maintain proper temperatures. Further, a heated hose with too much power density may result in inconsistent high temperatures as controller 28 can experience difficulties responding under transient conditions. Therefore, the power density of heated hoses 12A, 12B is controlled by altering the overall resistance per hose foot of heated hoses 12A, 12B and/or the amount of electrical current supplied to heated hoses 12A, 12B. Controller 28 alternating the electric current supplied to first heated hose 12A and second heated hose 12B with desired power densities provide the described benefits as well as many other benefits that will be realized by those skilled in the art.

Although the present invention has been described with reference to preferred embodiments, workers skilled in the art will recognize that changes may be made in form and detail without departing from the spirit and scope of the invention.

The invention claimed is:

1. A plural component dispensing system configured to mix a first fluid component and a second fluid component into an activated plural component, the plural component dispensing system comprising:
   a first fluid source containing the first fluid component;
   a second fluid source containing the second fluid component;
   a proportioner fluidly coupled to the first fluid source and the second fluid source;

an applicator including a mixer disposed remote from the first fluid source, the second fluid source, and the proportioner;
a first heated hose fluidly coupling the proportioner to the applicator;
a second heated hose fluidly coupling the proportioner to the applicator; and
a controller electrically coupled to the first heated hose and the second heated hose, wherein the controller is configured to independently supply an electric current to the first heated hose and independently supply an electric current to the second heated hose;
wherein:
the controller is configured to regulate an amount of electrical energy provided to the first heated hose and the second heated hose by controlling the electric current to the first heated hose and the electric current to the second heated hose from a power source; and
the controller is configured to alternate providing the electric current to the first heated hose and the electric current to the second heated hose, such that one of the first heated hose and the second heated hose is depowered while the other one of the first heated hose and the second heated hose is powered.

2. The plural component dispensing system of claim 1, wherein:
the first heated hose includes a first wire and a second wire extending a length of the first heated hose;
the second heated hose includes a third wire and a fourth wire extending a length of the second heated hose;
the first heated hose further includes a first inner tube defining a first fluid flowpath and includes a first sheath; and
the second heated hose further includes a second inner tube defining a second fluid flowpath and includes a second sheath.

3. The plural component dispensing system of claim 2, wherein the first wire and the second wire of the first heated hose are disposed radially between an external surface of the first inner tube and the first sheath, and wherein the first sheath encompasses the first wire and the second wire.

4. The plural component dispensing system of claim 3, wherein:
the first wire of the first heated hose extends along the external surface of the first inner tube in a helical configuration from a first end to a second end of the first heated hose; and
the second wire of the first heated hose extends along the external surface of the first inner tube in a helical configuration from the second end to the first end of the first heated hose;
wherein the helical configuration of the second wire is positioned in a plurality of pitch gaps of the helical configuration of the first wire.

5. The plural component dispensing system of claim 2, wherein the third wire and the fourth wire of the second heated hose are disposed radially between an external surface of the second inner tube and the second sheath, and wherein the second sheath encompasses the third wire and the fourth wire.

6. The plural component dispensing system of claim 5, wherein:
the third wire of the second heated hose extends along the external surface of the second inner tube in a helical configuration from a first end to a second end of the second heated hose; and
the fourth wire of the second heated hose extends along the external surface of the second inner tube in a helical configuration from the second end to the first end of the second heated hose;
wherein the helical configuration of the fourth wire is positioned in a plurality of pitch gaps of the helical configuration of the third wire.

7. The plural component dispensing system of claim 2, wherein:
the first wire of the first heated hose is positioned within and extends through the flow path of the first inner tube from a first end to a second end of the first heated hose;
the second wire of the first heated hose extends along an external surface of the first inner tube from the second end to the first end of the first heated hose;
the first wire of the first heated hose is coupled to the first inner tube through couplings positioned at the first end and the second end of the first heated hose; and
the second wire of the first heated hose is disposed between the external surface of the first inner tube and the first sheath.

8. The plural component dispensing system of claim 2, wherein
the third wire of the second heated hose is positioned within and extends through an interior of the second inner tube from a first end to a second end of the second heated hose;
the fourth wire of the second heated hose extends along an external surface of the second inner tube from the second end to the first end of the second heated hose;
the third wire of the second heated hose is coupled to the second inner tube through couplings positioned at the first end and the second end of the second heated hose; and
the fourth wire of the second heated hose is disposed between the external surface of the second inner tube and the second sheath.

9. The plural component dispensing system of claim 2, wherein
the first wire of the first heated hose is positioned within and extends through an interior of the first inner tube from a first end to a second end of the first heated hose;
the second wire of the first heated hose extends along an external surface of the first inner tube in a helical configuration from the second end to the first end of the first heated hose;
the first wire of the first heated hose is coupled to the first inner tube through couplings positioned at the first end and the second end of the first heated hose; and
the second wire of the first heated hose is disposed between the external surface of the first inner tube and the first sheath.

10. The plural component dispensing system of claim 2, wherein
the third wire of the second heated hose is positioned within and extends through an interior of the second inner tube from a first end to a second end of the second heated hose;
the fourth wire of the second heated hose extends along an external surface of the second inner tube in a helical configuration from the second end to the first end of the second heated hose;
the third wire of the second heated hose is coupled to the second inner tube through couplings positioned at the first end and the second end of the second heated hose; and the fourth wire of the second heated hose is disposed between the external surface of the second inner tube and the second sheath.

11. The plural component dispensing system of claim 1, wherein the controller is configured to:
transfer the electric current from the power source to the first heated hose according to a first frequency, the first frequency having a first on period during which electric current is provided to the first heated hose and a first off period during which electric current is not provided to heat the first heated hose; and
transfer the electric current from the power source to the second heated hose according to a second frequency, the second frequency having a second on period during which electric current is provided to the second heated hose and a second off period during which electric current is not provided to heat the second heated hose;
wherein the controller is configured such that the first on period is concurrent with the second off period and such that the second on period is concurrent with the first off period.

12. A method of operating a plural component dispensing system configured to mix a first fluid component and a second fluid component into an activated plural component material, the method comprising:
transferring, by a controller, electric current from a power source to a first heating circuit of a first heated hose for a first on time period;
transferring, by the controller, the electric current from the power source to a second heating circuit of a second heated hose for a second on time period; and
alternatingly powering the first heating circuit and the second heating circuit such that the first on time period alternates with the second on time period, such that the first heating circuit is powered while the second heating circuit is depowered.

13. The method of claim 12, wherein the first on period does not overlap with the second on period, and wherein the first on period is a first length and the second on period is a second length, the first length is the same as the second length.

14. The method of claim 12, further comprising:
directing, by the controller, the electric current to a first wire of the first heating circuit, the first wire extending a length of the first heated hose from a first axial end to a second axial end; and
receiving, by the controller, a return flow of the electric current from a second wire of the first heating circuit, the second wire extending a length of the first heated hose from the second axial end to the first axial end.

15. The method of claim 14, further comprising:
heating the first fluid component flowing through an inner tube of the first heated hose by heat generated by the electric current through the first wire, the first wire wrapped helically about the inner tube.

16. The method of claim 14, further comprising:
heating the first fluid component flowing through an inner tube of the first heated hose by heat generated by the electric current through the first wire, the first wire at least partially disposed within a flowpath of the first fluid component through the inner tube.

17. The method of claim 12 and further comprising:
regulating, by the controller, a temperature generated by the first heated hose by controlling a transfer rate of the electric current from the power source to the first heating circuit; and
regulating, by the controller, a temperature generated by the second heated hose by controlling a transfer rate of the electric current from the power source to the second heating circuit.

18. The method of claim 12 and further comprising:
supplying heat to the first heated hose by passing the electric current through a first wire extending from a first end of the first heated hose to a second end of the first heated hose;
returning the electric current to the controller through a second wire extending from the second end of the first heated hose to the first end of the first heated hose;
supplying heat to the second heated hose by passing the electric current through a third wire extending from a first end of the second heated hose to a second end of the second heated hose; and
returning the electric current to the controller through a fourth wire extending from the second end of the second heated hose to the first end of the second heated hose.

19. An electrically heated hose assembly comprising:
an inner tube, the inner tube defining a flowpath for fluid to flow from a first end of the inner tube to a second end of the inner tube;
a first heating circuit comprising:
a first wire extending from the first end of the inner tube to the second end of the inner tube;
a second wire formed separately from the first wire and electrically connected to the first wire, at the second end of the inner tube, the second wire extending from the second end of the inner tube to the first end of the inner tube; and
a sheath disposed about the inner tube, wherein at least one of the first wire and the second wire is disposed radially between the inner tube and the sheath;
wherein the first wire extends from a controller to the second end of the inner tube and the second wire extends from the second end of the inner tube to the controller.

* * * * *